(12) United States Patent
Draese et al.

(10) Patent No.: US 9,805,077 B2
(45) Date of Patent: Oct. 31, 2017

(54) METHOD AND SYSTEM FOR OPTIMIZING DATA ACCESS IN A DATABASE USING MULTI-CLASS OBJECTS

(75) Inventors: Oliver Draese, Holzgerlingen (DE); Benno Staebler, Holzgerlingen (DE); Torsten Steinbach, Boeblingen (DE); Knut Stolze, Jena (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1447 days.

(21) Appl. No.: 12/371,469

(22) Filed: Feb. 13, 2009

(65) Prior Publication Data

US 2009/0210445 A1 Aug. 20, 2009

(30) Foreign Application Priority Data

Feb. 19, 2008 (EP) .................. 08151617

(51) Int. Cl.
*G06F 17/30* (2006.01)

(52) U.S. Cl.
CPC .............. *G06F 17/30315* (2013.01)

(58) Field of Classification Search
CPC ......... G06F 17/30315; G06F 17/30442; G06F 17/30477
USPC ...................... 707/769, 770, 717
See application file for complete search history.

(56) References Cited

U.S. PATENT DOCUMENTS

| | | | | |
|---|---|---|---|---|
| 4,956,774 A | * | 9/1990 | Shibamiya et al. | |
| 5,091,852 A | * | 2/1992 | Tsuchida et al. | |
| 5,265,244 A | * | 11/1993 | Ghosh et al. | |
| 5,485,610 A | * | 1/1996 | Gioielli et al. | |
| 5,899,986 A | * | 5/1999 | Ziauddin | G06F 17/30463 |
| 6,631,446 B1 | * | 10/2003 | Cherkauer et al. | ... G06F 3/0613 711/133 |
| 7,840,607 B2 | * | 11/2010 | Henigman et al. | ......... 707/803 |
| 2001/0011268 A1 | * | 8/2001 | Tsuchida et al. | ..... G06F 9/5083 |
| 2002/0056025 A1 | * | 5/2002 | Qiu et al. | ............ G06F 12/122 711/133 |
| 2004/0122845 A1 | * | 6/2004 | Lohman et al. | ............ 707/102 |

(Continued)

OTHER PUBLICATIONS

"A hybrid Row-Column Oltp Database Architecture for operational Reporting", Jan Schaffner 2008.*

(Continued)

*Primary Examiner* — Taelor Kim
(74) *Attorney, Agent, or Firm* — Kali Law Group, P.C.

(57) ABSTRACT

Methods for optimizing data access in a row-oriented relational database containing data sets having attributes using a computer are presented the method including: causing a computer to analyze a database workload to determine an access frequency for each of the attributes; causing the computer to assign each of the attributes to a priority classes corresponding with the access frequency, where the priority classes include a higher priority class and a lower priority class, and where a higher priority class corresponds with a higher access frequency and a lower priority class corresponds with a lower access frequency; causing the computer to store the attributes in accordance with the classes, where the attributes assigned to the higher priority class are stored in a high priority storage medium, and where the attributes assigned to a lower priority class are stored in a low priority storage medium.

19 Claims, 6 Drawing Sheets

(56) References Cited

U.S. PATENT DOCUMENTS

| | | | |
|---|---|---|---|
| 2004/0260684 A1* | 12/2004 | Agrawal et al. | 707/3 |
| 2005/0234900 A1* | 10/2005 | Bossman et al. | 707/4 |
| 2006/0036989 A1* | 2/2006 | Chaudhuri et al. | G06F 17/30312 717/101 |
| 2006/0184338 A1* | 8/2006 | Lightstone et al. | 702/182 |
| 2007/0162426 A1* | 7/2007 | Brown et al. | G06Q 30/0283 |
| 2007/0185902 A1* | 8/2007 | Messinger et al. | 707/103 R |
| 2008/0162417 A1* | 7/2008 | Morris et al. | 707/2 |
| 2010/0114976 A1* | 5/2010 | Castellanos et al. | G06F 17/30312 707/803 |

OTHER PUBLICATIONS

Stonebraker, et al., "C-Store: A Column-oriented DBMS", (2005) Proceedings of the 31st VLDB Conference, Trondheim, Norway, 2005, 12 pp.

* cited by examiner

METHOD AND SYSTEM FOR OPTIMIZING DATA ACCESS IN A DATABASE USING MULTI-CLASS OBJECTS

RELATED APPLICATIONS

A claim for priority is hereby made under the provisions of 35 U.S.C. §119 for the present application based upon European Patent Application No. 08151617.1 filed on Feb. 19, 2008, which is incorporated herein by reference.

FIELD OF THE INVENTION

The invention relates to a method and a system for optimizing data access in a row-oriented relational database containing data sets with multiple attributes. Specifically, the invention provides a method and a system for increasing I/O efficiency depending on the workload characteristics of the database.

BACKGROUND

Traditional relational database systems, such as IBM's DB2, use a row-oriented storage system, where values of different attributes from the same data set are stored consecutively (i.e. row-by-row). When writing data, this row store architecture achieves high performance, since a single disk write suffices to push all of the fields of a single record out to disk; a database management system with a row store can therefore be considered as a write-optimized system.

As long as the database is not accessed, it may reside on storage medium such as a disk. However, as an application is run on the database, large numbers of rows have to be loaded into storage. For data sets containing a multitude of attributes, this requires a large amount of I/O, making queries to the database as well as statements/operations for data modification cumbersome and inefficient. As a consequence, database systems oriented toward ad-hoc querying of large amounts of data should be optimized with respect to reading operations. This applies particularly to applications such as data warehousing and business intelligence which rely on the efficiency the database system can provide when running complex queries on large data repositories. In an effort to create a read-optimized relational database management system, column-based data storage architectures have been suggested (see, for example, "C-Store: A Column-oriented DBMS" bus Mike Stonebraker et al., Proceedings of the $31^{st}$ VLDB Conference, Trondheim, Norway, 2005). A column-store stores each attribute in a database table separately, such that successive values of that attribute are stored consecutively. As a consequence of this data storage concept, column-stores offer improved bandwidth utilization, since only those attributes that are accessed by a query need to be read off disk. However, column-stores are afflicted with several disadvantages: In particular, column-stores perform poorly for insert queries since multiple distinct locations on disk have to be updated for each inserted tuple (one for each attribute). In addition, in order for column-stores to offer a standards-compliant relational database interface, they must at some point in a query plan stitch values from multiple columns together into a row-store style tuple to be output from the database. Thus, column-stores, while making queries and predicate evaluation to the database more efficient, often require considerably more CPU time than row-stores.

In view of these disadvantages of both row-oriented and column-oriented database architectures, it would be desirable to have a data storage concept which enables efficient access to the database while keeping CPU expenditure low.

BRIEF SUMMARY

It is an objective of the invention to provide a method and a system for optimizing data access in a row-oriented relational database containing data sets with multiple attributes. Specifically, it is an objective of the invention to modify a row-oriented relational database in such a way as to optimize access to the database against typical workload.

These objectives are achieved by the features of the independent claims. The other claims and the specification disclose advantageous embodiments of the invention.

In embodiments methods for optimizing data access in a row-oriented relational database containing data sets having attributes using a computer are presented, the method including: causing a computer to analyze a database workload to determine an access frequency for each of the attributes; causing the computer to assign each of the attributes to a priority classes corresponding with the access frequency, where the priority classes include a higher priority class and a lower priority class, and where a higher priority class corresponds with a higher access frequency and a lower priority class corresponds with a lower access frequency; causing the computer to store the attributes in accordance with the classes, where the attributes assigned to the higher priority class are stored in a high priority storage medium, and where the attributes assigned to a lower priority class are stored in a low priority storage medium. In some embodiments, methods are presented where the attributes assigned to the high priority class are reallocated to a high class fragments, and where the attributes assigned to the low priority class are reallocated to a low class fragments. In some embodiments, methods are further presented where the high class fragments are stored in the high priority storage medium, and where the low class fragments are stored in the low priority storage medium. In some embodiments, methods are further presented where a memory space corresponding with the high priority class and the low priority class is reallocated for additional storage.

In other embodiments, systems for optimizing data access in a row-oriented relational database are presented, the row-oriented relational database including a data sets each dataset having a attributes, the system including: an access monitoring system for monitoring database workload to determine an access frequency for each of the attributes; a classification system for assigning the attributes to a classes corresponding with the access frequency, where the classes include at least a high priority class and a low priority class; and an attribute storage system for storing the attributes assigned to the classes to a storage media.

In other embodiments, computer program products for optimizing data access in a row-oriented relational database containing a data sets having a attributes are presented, the computer program product including: program instructions for analyzing a database workload to determine an access frequency for each of the attributes; program instructions for assigning each of the attributes to a priority classes corresponding with the access frequency, where the priority classes include a higher priority class and a lower priority class, and where a higher priority class corresponds with a higher access frequency and a lower priority class corresponds with a lower access frequency; program instructions for storing the attributes in accordance with the classes, where the attributes assigned to the higher priority class are stored in a high priority storage medium, and where the attributes assigned to a lower priority class are stored in a low priority storage medium.

Advantageously, the attributes are assigned to the classes according to priority, in such a way that the most relevant attributes are assigned to high priority classes; specifically, attributes are assigned to different physical storage media according to their class. Moreover, information on the class of the attributes stored in a given page can be used for buffer pool management such that pages containing attributes belonging to a high class will be less likely to be evicted from buffer pool than pages containing attributes belonging to a low class. Favorably, the classification of the attributes is based on monitoring accessing frequencies of the attributes during workload execution. The step of analyzing database workload can be executed inside the database engine where column data is accessed anyway, thus saving computing resources.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments, wherein is shown in.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION

Figure 1:
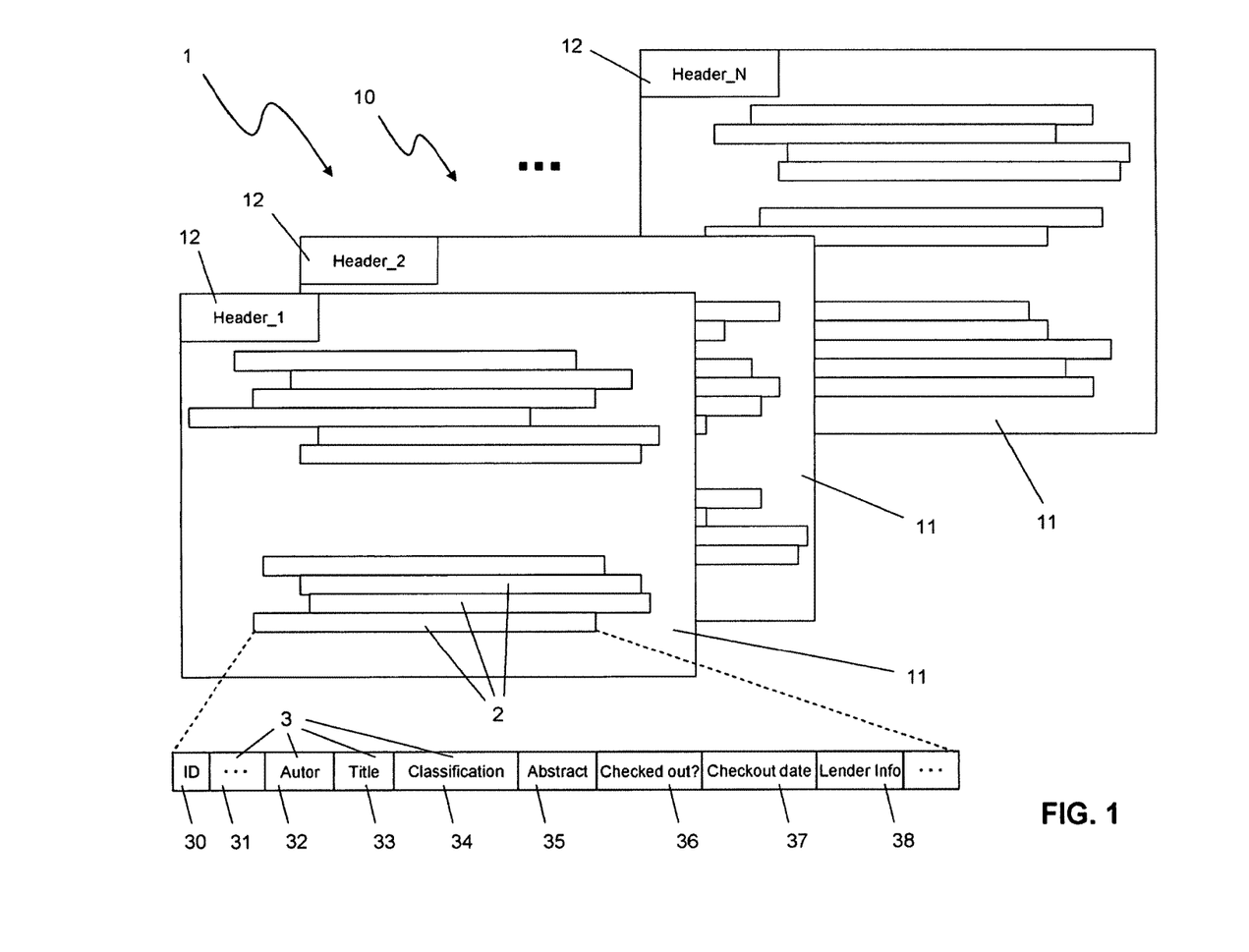
FIG. 1 shows a schematic diagram of part of a relational model database containing rows with a number of columns.

FIG. 1 shows a schematic diagram of part of a relational model database 1 of a library card catalogue, containing a collection of records 2 representing library entries such as books, catalogues, publications etc. Database 1 being a row-oriented database, the records 2 are stored in a table 10 where information about each library entry is represented in the form of rows 2 containing columns 3. The columns 3 enumerate the various attributes of data representing actual instances of library entries, such as identification number (in column 30), author, title and library classification of the book (in columns 32 to 34), checkout information on the book as well as the name/address of the last lender (in columns 36 to 38) etc. Each row 2 represents an actual instance, i.e. a specific library entry, enumerating its various attributes. In the following description, the terms "row" and "data set" will be used interchangeably.

Typically, a library database will hold a large number of data sets 2; as a consequence, table 10 holding the records of all library entries will span a multitude of pages 11 (each of them typically between 4 kByte and 32 kbyte in size). Each page 11 holds a header 12 containing information on the page identification, page type, position in database 1 etc. Typically, a page 11 will hold between 100 and 500 data sets. Depending on the amount of data stored in the columns 3, a record 2 may in fact extend over several pages (e.g. if complete contents of books/publications and/or author biographies are stored in column 35). There are mechanisms in place for overflow etc.

Applications are run on database 1 in order to retrieve specific information on the collection of related records 2 contained in database 1. As these applications are carried out, specific columns 3 (representing certain attributes) will be accessed to retrieve the desired information. Generally, and depending on the specific applications, some columns 3 will be accessed more frequently than others. Thus, by counting column accesses during the execution of the actual workload, one obtains an estimate of the relevance of individual columns. This information can be used to assign storage, computing resources, etc. to the columns according to their relevance and to focus process optimizations on the most relevant columns. Unlike conventional optimizing technologies for speeding up SQL processing which require detailed information (e.g. statistics) about the data stored in the database to optimize the access to this data, the invention suggests pinpointing those attributes which, in typical applications run on the database, are used more frequently, and assigning those to storage media with faster access, thus speeding up SQL processing.

As an example, consider an application in which the library database 1 is to be scanned for checked out books which are overdue so that the lenders of these books can be reminded to return the books. In this application, column 32 (containing the name of the author), column 33 (containing the title of the book) and column 38 (containing name/address of the lender) are to be read out for all books which have been lent (attribute "checked out?" contained in column 36) and whose checkout date (attribute contained in column 37) dates back further than a certain threshold (e.g. four weeks).

Figure 3:
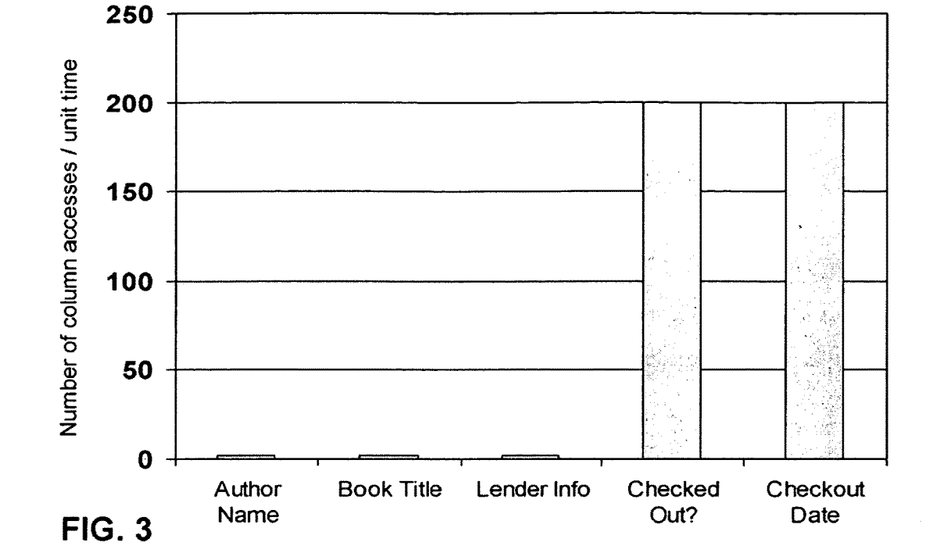
FIG. 3 shows a diagram depicting access frequencies of various columns of the database of FIG. 1 as a specific application is run on the database.

When executing this application, a table scan of database 1 is carried out in order to filter the library records with respect to the attributes "checked out?" and "checkout date". If 5% of all library entries registered in the database 1 are lent, the checkout predicate ("checked out?") has a filter factor of 5%. If 20% of all lent books were checked out earlier than the pre-defined threshold, the date predicate ("checkout date") has a filter factor of 20%. The combined filter factor of this application thus amounts to 20%*5%=1%, so that, while all rows 2 of table 10 are scanned, only 1% of all rows 2 will eventually be selected. FIG. 3 depicts a graph of the number of column accesses per unit time for the columns 32 ("Author Name"), 33 ("Book Title"), 38 ("Lender Info"), 36 ("Checked Out?") and 37 ("Checkout Date"); as can be seen, columns 36 and 37 are accessed on average one hundred times more frequently than columns 32, 33 and 38.

With a conventional table scan approach, the application requires each data set 2 to be loaded completely into memory for predicate evaluation. Since some of the attributes (notably the abstract/contents of the book contained in column 35) are large in size compared to the predicate attributes 36 ("Checked Out?") and 37 ("Checkout Date"), a lot of data is loaded into memory without being used in later operations: in only 1% of the scanned data sets 2, the values of the attributes 32, 33, 38 are used after predicate evaluation. Thus, a lot of unnecessary I/O operations are carried out, squandering the system's resources and blocking buffer pools which could otherwise be used productively.

In order to decrease the amount of I/O operations and to free buffer resources, the actual workload is analyzed with respect to the frequency with which individual columns 3 are accessed during the execution of the current application(s). This analysis can be executed inside the database engine where column data is accessed anyway (i.e. concurrently with the application), thus saving computing resources. As a result of this analysis, each column 3 of database 1 is assigned to a class: columns 3' whose contents are frequently accessed are deemed to be "important" and are thus assigned to a high class whereas columns 3" whose contents are less frequently accessed are deemed to be "less important" and are thus assigned to a lower class. In the example of FIG. 1, when scanning all data sets 2 for books which were checked out before a certain date and were not returned, the columns 36 ("Checked Out?") and 37 ("Checkout Date") corresponding to the predicative attributes are always accessed and thus are assigned to a high class; columns 32, 33, 38, however, are only accessed in 1% of all cases and are thus assigned to a low class. The data from columns 32, 33 and 38 is returned to the client application as result set of the query.

Consequently, the class distribution of the columns 3 furnishes information on which data base objects (tables 10, indices etc.) are more relevant (i.e. more frequently accessed) than others and which columns 3 within these objects are most relevant.

Note that in general—except for very simple systems—it is not adequate to perform a static workload analysis for determining the frequency of data access of the various columns; rather, the workload has to be determined at runtime when online statistics can be collected during query execution. Moreover, the query statements of the application in themselves generally do not contain sufficient information to predict column data usage: In the example of FIG. 1, the selectivity of the predicate attributes "Checked Out?" and "Checkout Date" would have to be known prior to statement execution in order to realize that only 1% of all data sets 2 will match. Even if this selectivity could be evaluated making use of accurate statistics, a cross statement analysis of data set 2 usage would be at least difficult, if not impossible. A more feasible approach consists in simply counting the access on attribute level. Statistics can be collected by the data base management system (DBMS) to find out the actual access frequency per column 3. This statistics counter would be increased by [n] for the columns 36 ("Checked Out?") and 37 ("Checkout Date") and by [n*0.01] for the columns 32, 33 and 38. After some time of database usage, the statistics thus gained can be used to decide how to divide the columns 3 of data sets 2 into a high class (containing the columns 36 and 37) and a low class (containing the columns 32, 33 and 38). Note that in this application, some columns 30, 35 of database 1 are never accessed; these columns 30, 35 can grouped into the low class as well, or, alternatively, into still another class characterized by an even lower priority.

While in the example of FIG. 1 the columns 3 are assigned to only two different classes according whether their access frequency exceeds a certain threshold value, it is obvious that in more intricate applications (and in workloads comprising a mix of different applications), a larger number of classes can be formed.

Once the columns 3 have been clustered into multiple (two or more) classes according to the access frequency of their attributes, the data storage scheme is reorganized in such a way as to assign better and/or more database resources to columns 36 ("Checked Out?") and 37 ("Checkout Date") belonging to higher classes, thus facilitating access to these frequently used columns 36, 37. Contrary to the paradigm that all attributes of a record are to be stored together on a single page 11, rows 2 of columns 3 are broken up into multiple fragments 2', 2", where each part 2', 2" corresponds to a cluster of columns 3', 3" of different class and is stored on different pages 11', 11". In the example of FIG. 1, the rows 2 of library data are broken up into a fragment 2' containing the high class columns 36 ("Checked Out?") and 37 ("Checkout Date") and a fragment 2" containing the remaining columns, namely the low class columns 30 to 35 and 38. Columns 36, 37 belonging to fragment 2' of row 2 are stored on pages 11', while columns 30 through 35 and 38 belonging to fragment 2" of row 2 are stored on pages 11" (see FIG. 2). As a consequence, row 2 spans multiple pages 11', 11". Each row fragment 2', 2" comprises a so-called row identifier 5',5" containing information on the location of the remaining fragments of row 2 (alternatively, a pointer system connection row fragments 2' and 2" could be used).

Figure 2:
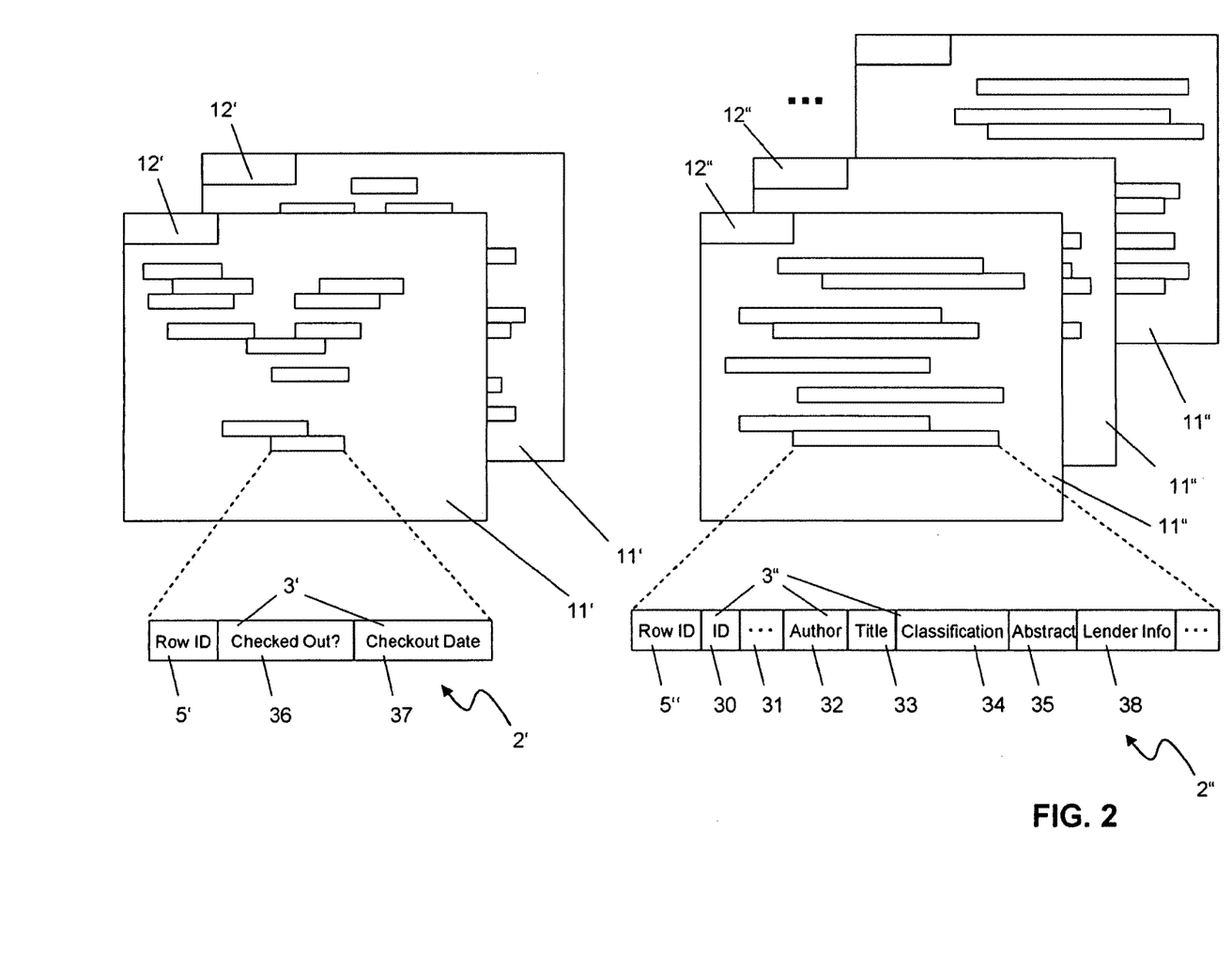
FIG. 2 shows a schematic diagram of the database of FIG. 1 after performing a reorganization of the data, with low class columns and high class columns stored on different pages.

Since rows 2 are split up into several fragments 2', 2", each fragment 2', 2" has a smaller size than the original row 2; this is indicated schematically in FIG. 2 by drawing the row fragments 2', 2" smaller than the rows 2 in FIG. 1. For example, while original row 2 had a typical size of about 200 Bytes, high class fragment 2', containing columns 36 ("Checked Out?") and 37 ("Checkout Date"), may only have a typical size of 20 bytes. Thus, the number of pages 11' needed to store the high class fragments 2' will typically amount to only a small fraction of the total number of pages 11. By assigning only these high class pages 11' to memory or high-speed disk, the total time needed for carrying out the application can be reduced considerably while keeping the cost for high-speed storage at a reasonable level.

Having assigned the columns 3 to the two (or multiple) classes, the reorganization of row fragments 2', 2" onto different pages 11', 11" can be carried out as follows: As queries are issued against the database, data sets 2 containing both high-class columns 3' and low class columns 3" are loaded from page 11 and processed. Since each column 3', 3" has been assigned to a class, each fragment 2', 2" of row 2 can be assigned to an appropriate page 11', 11" after processing. Thus, high class fragments 2' will be stored on pages 11' located on an easily accessible storage medium (e.g. memory or high-speed disk) while low class fragments 2" will be stored on pages 11" located on a low priority storage medium (like a slow disk or tape). Once all data sets 2 originally contained in pages 11 have been processed and the correct storage of their fragments 2', 2" reassigned to pages 11', 11" has been verified, the original pages 11 can be reallocated.—Alternatively, an "in-place" reorganization of the rows 2 can be carried out by reallocating the fragments page-by-page: As soon as all rows 2 contained in a given page 11 have been reassigned to new pages 11', 11" according to their class, original page 11 can directly be reallocated for storage either of high class fragments 2' or of low class fragments 2". While this "in-place" reorganization is very effective by minimizing storage needs, it reuses the original storage space and thus does not offer the option of storing different class fragments 2', 2" on different storage media and therefore does not take advantage of using prime storage for frequently used columns 3'.—A mixture of these two reorganization approaches is also possible: if, for example, the original page 11 belongs to a low priority storage medium, this page 11 could be reorganized "in-place" in such a way as to hold low class fragments 2', while high class fragments 2" will be stored on pages 11" located on a high priority storage medium.

Once the data storage scheme has been changed by reorganization, optimization processes can be focused on the more relevant columns 3', leading to a more effective usage of time and resources. Specifically, statistics on these most relevant columns 3' can be gained at a higher frequency than for the columns 3" in lower classes, leading to a more accurate estimation of access paths. Moreover, easy access storage (main memory, buffer pools) can be allocated to columns 3' belonging to high classes, and these columns 3' can be kept in memory for longer than columns 3" belonging to lower classes.

As described above, columns 3 may be classified by monitoring and evaluating their individual access rate. Alternatively, if certain columns are seen to be used predominantly in combination, accesses of these columns may be monitored and evaluated jointly, assuring that these columns will be placed into the same class. Thus, if many applications of the library database 1 access the checkout information attributes ("Checked Out?" and "Checkout Date") jointly, columns 36 and 37 should be placed into the same class.

Note while in the example described above, only a single (very simple) application on the database was considered, typical workloads carried out on the database will consist of a multitude of applications; irrespective of the number and kind of applications, the relative accessing frequencies of columns recorded during these operations are indicative of the specific workload pattern. Independent of the mix of applications run on the data base, the accessing frequencies can thus be used to assign these objects to different classes as outlined above. Moreover, the column access frequencies can be customized to the mix of applications that are being run on the database: Thus, if a specific application "A" is known to have a higher priority than another specific application "B", the column accessing frequencies encountered while running "A" can be given an higher statistical weight than the accessing frequencies connected with application "B". If, for example, the relative weights of applications "A" and "B" had a ratio of 2:1, each access made on behalf of "A" would be counted twice whereas each access made on behalf of "B" would be counted only once. As a consequence, columns accessed by application "A" will generally be more likely to become higher-class columns than columns accessed by application "B".

Note also that each application creates a typical workload which is issued against the database. This workload is defined by the application implementation as well as by patterns established by usage scenarios typical of the owner/user's business; for example, a typical workload pattern carried out on the library database will differ considerably from a typical workload pattern carried out on a data warehouse or a customer relationship management system. The workload might change over time and there may be periodic workload shifts due to the company's business processes and needs, but this will not happen altogether unexpectedly in most cases. By continuously monitoring accessing frequencies of the database objects, the need of a reorganization of the objects between high and low classes may thus be detected and implemented. If the workload on the data base 1 shifts such that some of the originally more relevant columns 3' are accessed less frequently while some of the originally less relevant columns 3" become used more often, this is automatically detected by the accessing analysis, leading to a temporal or permanent reclassification of the columns 3', 3". This can form the basis of a reorganization of the data storage scheme which can be carried out selectively for those attributes whose class affiliation has changed.

Figure 4:
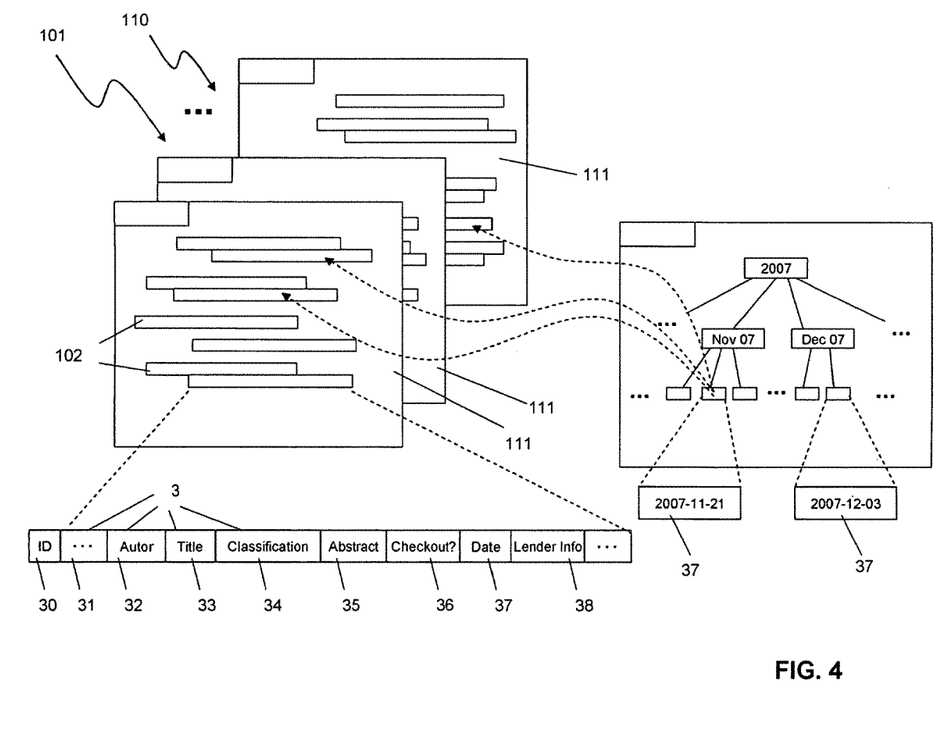
FIG. 4 shows a schematic diagram of part of a database containing the same data as the database of FIG. 1 but making use of an index structure.
Figure 5:
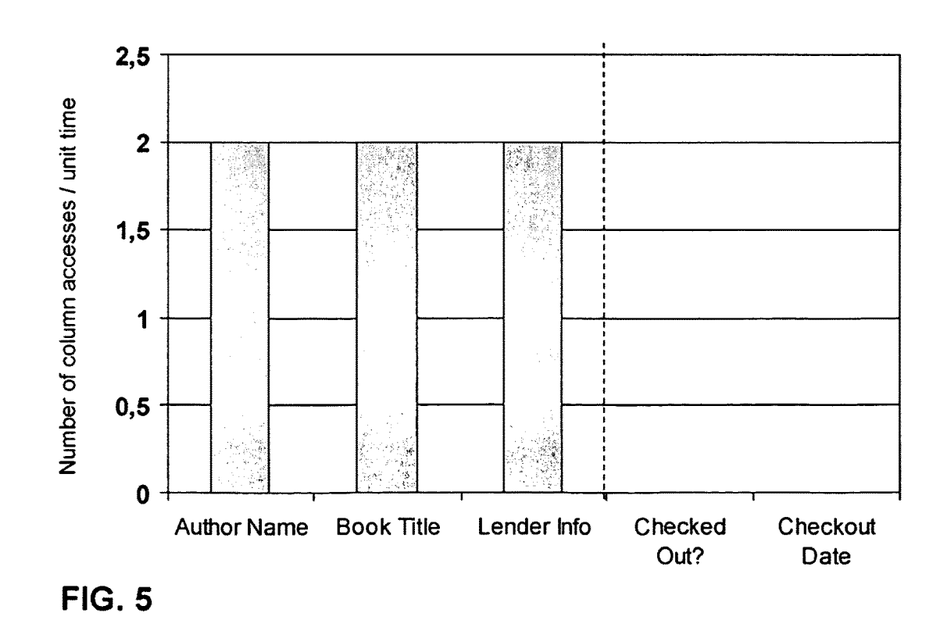
FIG. 5 shows a diagram depicting access frequencies of various columns of the database of FIG. 4 as a specific application is run on the database.

Some database systems, in order to increase their speed, make use of index structures. Use of an index allows a set of table rows matching some criterion to be located very quickly. In the example of a library database, indexing may be used for table columns 36 ("Checked Out?") and 37 ("Checkout Date"). FIG. 4 shows an implementation of a database 100 with column 37 ("Checkout Date") used as an index stored in a tree data structure; the index corresponding to column 36 ("Checked Out?") may, for example, be stored in a sorted list (not shown in FIG. 4). For the application selecting Author Name (column 32), Book Title (column 33) and Lender Information (column 38) of library entries which were Checked Out (column 36) before a Checkout Date (column 37), table 110 is accessed comparatively rarely, because the predicative evaluation of "Checked Out?" and "Checkout Date" is performed on the index. When a workload analysis is carried out on this application while running it on database 101, only the attribute values for "Author Name", "Book Title" and "Lender Information" are accessed through table 110, so that the access frequency of these columns 32, 33, 38 will be large compared to those of indexed columns 36, 37 (see FIG. 5). As a result, a split of the rows into high and low class fragments would place columns 36 and 37 on low class pages and columns 32, 33 and 38 on high class pages. Even if this seems strange at first sight (given that columns 36, 37 contain the predicative attributes), it will still lead to the correct classification since the values of columns 36, 37 stored on low class pages are used rarely compared to the values of the other attributes stored in columns 32, 33, 38. Thus, the creation of an index structure in a database may change the statistics considerably and may make a reassignment of the data to different class tables necessary.

Multi-class clustering of columns obtained by splitting up rows 2 into fragments 2', 2" according to column access rates and assigning different fragments 2', 2" to different pages 11', 11" according to their class (i.e. access frequency) brings about several advantages:

Optimization of Storage Devices and Systems:

The main benefit of the multi-class clustering is reaped by assigning physical storage to individual columns 3', 3" according to their class. This implies that pages 11', 11" containing columns assigned to different classes are treated differently with respect to their physical storage. Note that access to data in main storage is typically a factor of 1000 times faster than access to data stored on disk. By storing frequently used columns 3' on prime storage media, I/O times can thus be reduced considerably. Specifically, in the example of FIGS. 1 and 2, high-class columns 36, 37 assigned to pages 11' are stored on media with fast access mechanisms (e.g. flash memory or high-speed disk) while low-class columns 30 through 35 and 38 assigned to pages 11" are stored on slower disks or even tape devices. Despite the fact that hard disk storage is becoming cheaper, it can still amount to a noticeable cost factor; thus, by using cheaper media for low class pages, storage cost can thus be reduced.

During workload analysis, rarely used columns 3" are identified and classified as low class. In many scenarios, queries accessing such rarely used columns 3" do not have to meet the highest performance goals, so that slower response times are acceptable. Thus, using slower storage devices for pages 11" containing low class data often does not pose a severe restriction. The classification derived by workload analysis inherently provides information on which columns may qualify for storage on different types of devices. Specifically, statistics on column accesses in a mix of applications (with equal or differing relative priorities) will yield indications on which row fragments will be stored on high/low priority devices.

This reduces the amount of information a database administrator has to consider when making such decisions.

Optimization of Buffer Pool Management:

Secondly, the classification of pages 11', 11" can be exploited for buffer pool management within the database management system. Whenever a buffer pool becomes full, a decision has to be made which pages are to be evicted from the buffer pool in order to make room for other pages; this decision is known to be very hard. One typical implementation used in buffer pool management systems is to first evict those pages which were not used for a long time. However, when multi-class clustering of pages 11', 11" is being used, the database management system has implicit knowledge about the priority of pages in the buffer pool. A low class page 11" may have a lower priority than a high class page 11', since the high class page 11' is more frequently used and therefore has a higher probability being needed again within a given time interval. Thus, if a decision has to be made, a low class page 11" should be evicted sooner from the buffer pool than a high class page 11'.

Note that the classification of the pages 11', 11" can be taken into account during buffer pool management without having to develop and apply altogether new strategies for buffer pool management; rather, only smalls adjustment to the existing algorithms are necessary.

Enhanced Flexibility with Respect to Row Length:

Moreover, splitting rows 2 into fragments 2', 2" and storing them on different pages 11', 11" has the consequence of reducing the effective row length. This can be of great advantage in some of the currently used database systems which mandate that all data of the type INTEGER, CHARACTER VARYING etc. contained in a row must fit onto a single data page, with the exception of large objects which are treated differently; these database systems thus limit the total row length. With the introduction of multi-class objects, each object (e.g. row 2) is split into multiple fragments (e.g. row fragments 2', 2"), where each fragment belongs to a different class. Thus, row 2 is no longer confined to a single page 11, but its fragments 2', 2" are spread over multiple pages 11', 11", thus lifting the size limitation posed on row 2.

Optimization of Locking Strategies:

Finally, storing columns 3', 3" of different class on different pages 11', 11" provides an opportunity of optimizing locking strategies. Locking is the act of putting a lock (access restriction) on an aspect of a database which at a particular given instance is being modified; this helps maintain the integrity of the data by ensuring that only one user at a time can modify the data. Many database systems make use of a row based locking mechanism: whenever a database transaction accesses an attribute 32, 33, . . . in a table 10, the whole row 2 containing that value is locked.

The introduction of multi-class objects offers a simple way to refine lock granularity by locking only those fragments of the row that are stored together on a page (rather than locking complete rows). In the example of FIG. 2, an access to column 36 ("Checked Out?") will imply locking the value contained in column 37 ("Checkout Date"), but not columns 30 through 35 and 38, so that a different transaction could access these columns 30-35 and 38. Thus, splitting up rows 2 into fragments 2', 2" to be stored on different pages enhances accessibility of the database. Note that the adaptation of locking procedures to multi-class objects can be implemented without any significant modifications to the lock manager since row fragments 2', 2" can be treated in the same way as regular rows 2.

Figure 6:
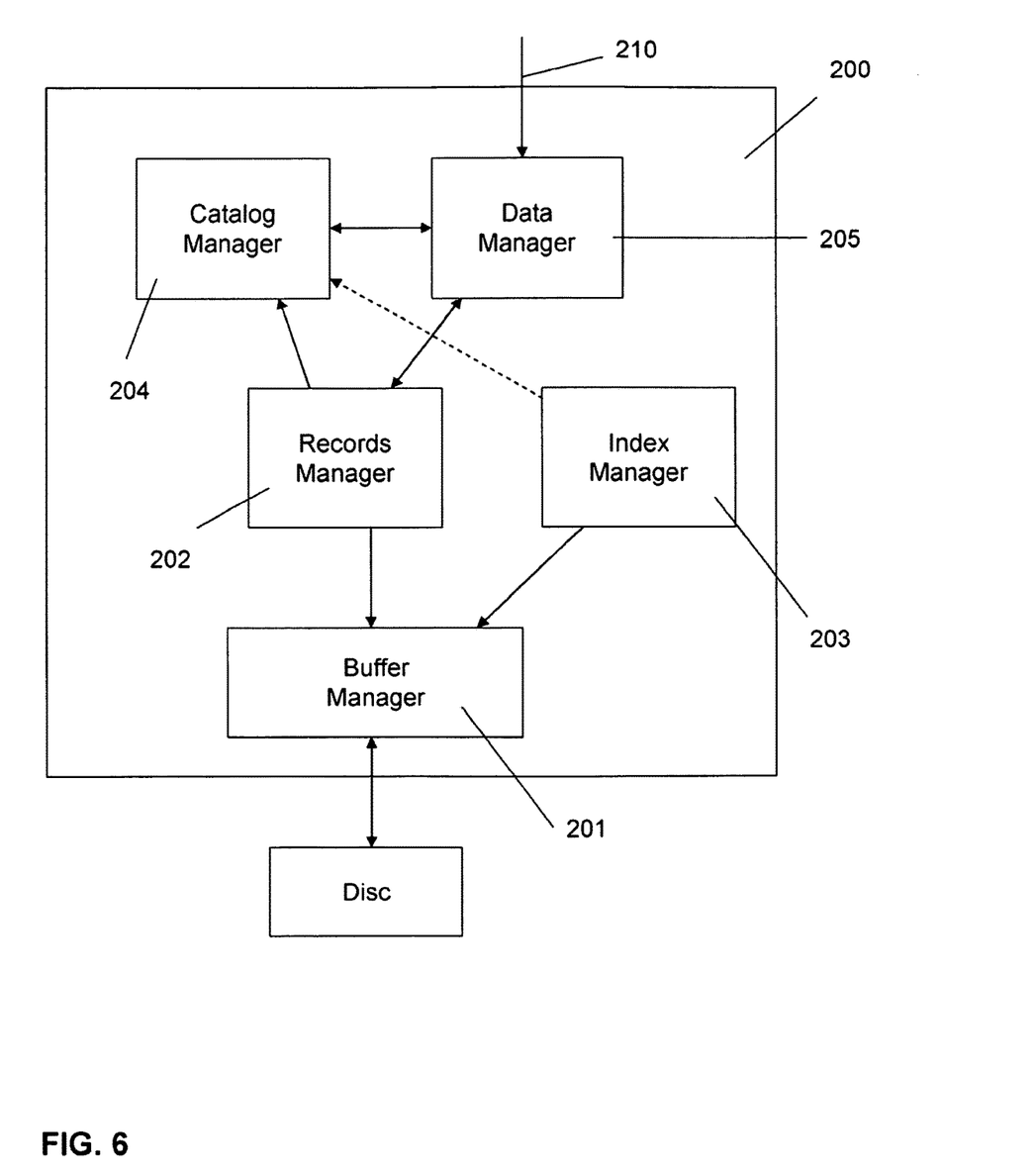
FIG. 6 shows a schematic diagram of a database management system.

Referring now to FIG. 6, an implementation of an embodiment of the invention in a database management system (DBMS) 200, e.g. LBM's DB2, is shown. DBMS 200 comprises a buffer manager 201 responsible for the allocation of buffer space and for reading disk pages 11 into main memory (buffer pool) as needed. The buffer manager 201 makes calls to the underlying component of the database system, which actually performs these functions on disk pages. DBMS 200 also comprises a records manager 202 responsible for organizing records on pages, an index manager 203 responsible for organizing data on index pages as well as implementing relations between the index pages, and a catalog manager 204 holding information on all data base objects (e.g. tables, columns, data types etc.). In order to implement the invention in DBMS 200, the catalogue manager 204 is supplemented to hold information on the specific class each column 3', 3" has been assigned to. As a query 210 directed at data manager 205 calls for accessing a specific data set 2, data manager 205 makes a request to record manager 202 to fetch the corresponding row 2 comprising columns 3. Catalog manager 204 furnishes the information that data set 2 is divided up in two fragments 2', 2". Records manager 202 determines which fragments are needed to (a) evaluate predicates in a row and/or (b) retrieve values to be returned to the client application. Only those pages storing fragments with columns needed for (a) or (b) are retrieved via the buffer manager 201. If predicates are to be evaluated, and if the evaluation indicates that the row matches the predicates, then the pages storing fragments for (b) are retrieved for the buffer manager 201 to be returned to the client application.

Figure 7:
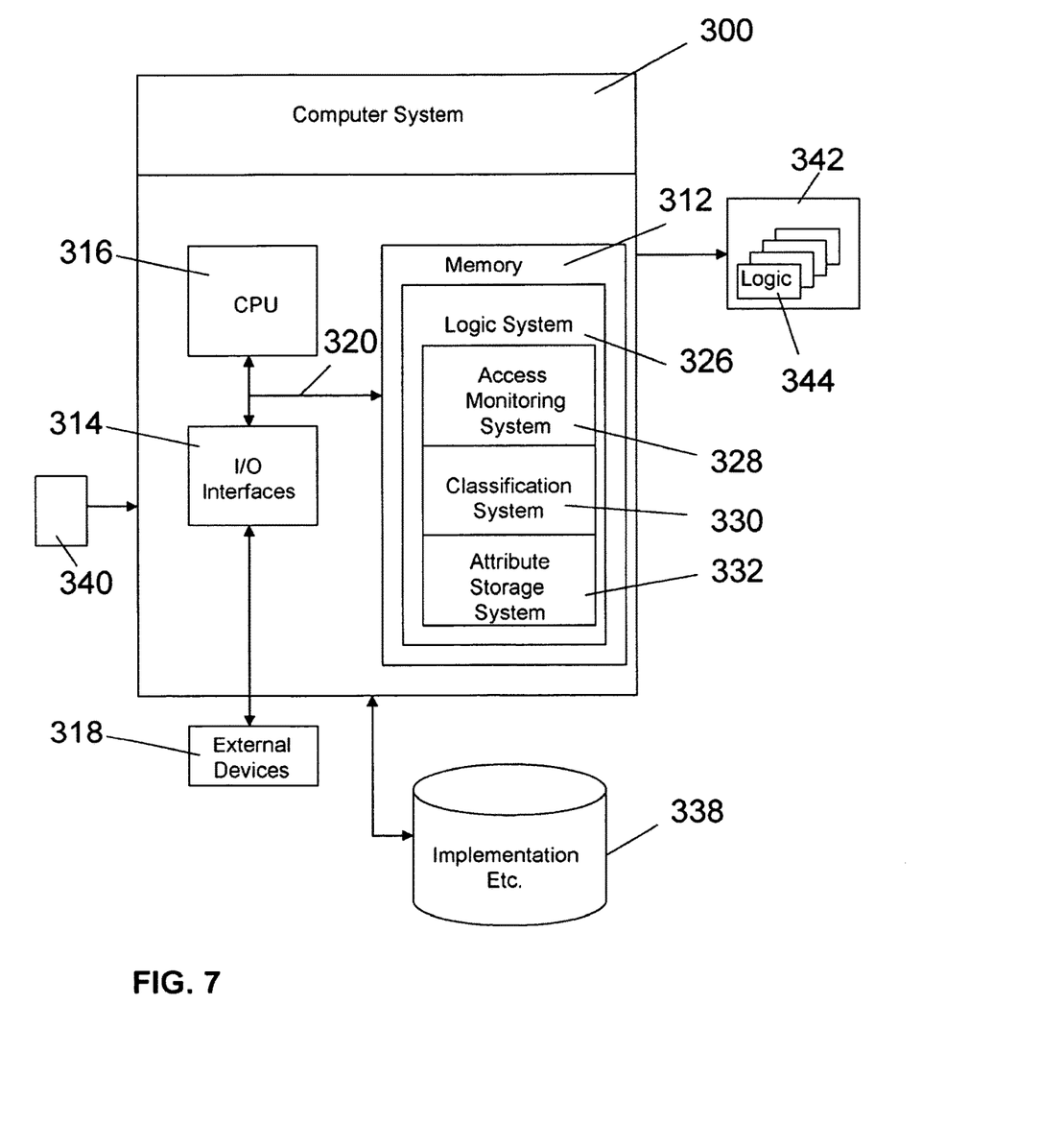
FIG. 7 shows a computer system implementation of the present invention.

Referring now to FIG. 7, a computer system 300 implementation of the preferred embodiment of the present invention is shown. Specifically, the present invention can be implemented as a computer system 300 and/or program product 326 for optimizing data access in a row-oriented relational database containing objects (rows 2) with multiple attributes (columns 3). This allows user 340, notably a database management system, to reorganize database storage in such a way that columns 3', 3" holding the attributes will be stored in different regions of storage depending on the frequency in which they are accessed. Computer system 300 may form part of a database management system or may be implemented as a separate system. As depicted, computer system 300 generally comprises memory 312, input/output (I/O) interfaces 314, a central processing unit (CPU) 316, external devices/resources 318, bus 320 and data base 338. Memory 312 may comprise any known type of data storage and/or transmission media, including magnetic media, optical media, random access memory (RAM), read-only memory (ROM), a data cache, a data object etc. Moreover, memory 312 may reside at a single physical location, comprising one or more types of data storage, or can be distributed across a plurality of physical systems in various forms. CPU 316 may likewise comprise a single processing unit, or be distributed across one or more processing units in one or more locations, e.g. on a client and server.

I/O interfaces 314 may comprise any system for exchanging information from an external source. External devices 318 may comprise any known type of external device, including keyboard, mouse, voice recognition system, printer, monitor, facsimile etc. Bus 320 provides a communication link between each of the components in the computer system 300 and likewise may comprise any known type of transmission link, including electrical, optical, wireless etc. In addition, although not shown, additional components such as cache memory, communication systems, system software etc. may be incorporated into computer system 300.

Database 338 provides storage for information necessary to carry out the present invention. Such information could include, inter alia: (1) workload and applications information of database 1; (2) accessing frequencies of objects stored database 1; (3) threshold values etc. Database 338 may include one or more storage devices, such as a magnetic disk drive or an optical disk drive. In another embodiment, database 338 includes data distributed across, for example, a local area network (LAN), wide are network (WAN) or a storage area network (SAN) (not shown in FIG. 7). Database 338 may also be configured in such a way that one of ordinary skill in the art may interpret it to include one or more storage devices. Moreover, it should be understood that database 338 could alternatively exist within computer system 300.

Stored in memory 312 is logic system 326. As depicted, logic system 126 generally includes Access Monitoring System 328, Classification System 330 and Attribute Storage System 332. The systems shown herein carry out the functions described above.

Access Monitoring System 328 will monitor database workload to determine accessing frequencies of the columns 3 containing the attributes of data sets 2. Classification System 330 will assign the columns 3 to different classes depending on their accessing frequency. Attribute Storage System 332 will store columns 3', 3" assigned to different classes in different regions of storage 11', 11". Attribute Storage System 332 will thus reorganize the data structure within database 1 in such a way that fragments 2', 2" of rows 2 will be stored in memory or on disc according to their accessing frequencies.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer readable medium providing program code for use by or in connection with a computer or any instruction execution system. For the purposes of this description, a computer-usable or computer readable medium can be any apparatus that can contain, store, communicate, propagate, or transport the program for use by on in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method for optimizing data access in a row-oriented relational database containing a plurality of data sets having a plurality of attributes using a computer, the method comprising:
   causing a computer to analyze a database workload to determine an access frequency for each of the plurality of attributes, wherein each of the plurality of attributes corresponds with a column, wherein the plurality of data sets correspond with a plurality of rows, and wherein the analysis is executed inside a database engine where column data associated with the column is accessed;
   causing the computer to assign each of the plurality of attributes to a plurality of priority classes corresponding with the access frequency, wherein the plurality of priority classes includes at least a higher priority class and a lower priority class, and wherein a higher priority class corresponds with a higher access frequency and a lower priority class corresponds with a lower access frequency;
   causing the computer to store the plurality of attributes in a plurality of modified datasets in accordance with the plurality of priority classes, wherein the plurality of attributes assigned to the higher priority class are stored in a high priority storage medium, wherein the plurality of attributes assigned to a lower priority class are stored in a low priority storage medium, and wherein rows corresponding with the plurality of modified datasets in the row-oriented relational database are broken up into multiple row fragments for storage in different pages by column corresponding with the plurality of attributes such that the row-oriented relational database is reorganized and data access to the database is optimized.

2. The method of claim 1, wherein the plurality of attributes assigned to the high priority class are reallocated to a plurality of high class fragments, and wherein the plurality of attributes assigned to the low priority class are reallocated to a plurality of low class fragments.

3. The method of claim 2, wherein the plurality of high class fragments are stored in the high priority storage medium, and wherein the plurality of low class fragments are stored in the low priority storage medium.

4. The method of claim 3, wherein a memory space corresponding with the high priority class and the low priority class is reallocated for additional storage.

5. The method of claim 2, wherein a memory space corresponding with the high class and the low class is reorganized in-place by reallocating the plurality of high class fragments and the plurality of low class fragments page-by-page.

6. The method of claim 2, further comprising:
   causing the computer to manage a buffer pool by evicting the plurality of low class fragments from the buffer pool before the plurality of high class fragments in response to the buffer pool becoming full.

7. The method of claim 1, further comprising:
causing the computer to substantially continuously monitor the database workload to optimize the row-oriented relational database such that the method is responsive to a change in a database workload pattern, wherein the database workload pattern corresponds with a use of at least one application.

8. The method of claim 1, further comprising:
causing the computer to analyze the database workload inside a database engine.

9. The method of claim 1, wherein causing the computer to store the plurality of attributes further comprises:
causing the computer to store the plurality of attributes concurrently while a query is issued against the row-oriented relational database.

10. The method of claim 1, further comprising:
causing the computer to manage a buffer pool by evicting the plurality of attributes assigned to the lower priority class from the buffer pool before the plurality of attributes assigned to the higher priority class in response to the buffer pool becoming full.

11. A system of computer hardware for optimizing data access in a row-oriented relational database, the row-oriented relational database including a plurality of data sets each dataset having a plurality of attributes, the system comprising:
a processor;
an access monitoring system for monitoring database workload to determine an access frequency for each of the plurality of attributes, wherein each of the plurality of attributes corresponds with a column, wherein the plurality of data sets correspond with a plurality of rows, and wherein the monitoring is executed inside a database engine where column data associated with the column is accessed;
a classification system for assigning the plurality of attributes to a plurality of classes corresponding with the access frequency, wherein the plurality of classes include at least a high priority class and a low priority class; and wherein a higher priority class corresponds with a higher access frequency and a lower priority class corresponds with a lower access frequency;
an attribute storage system for storing the plurality of attributes in a plurality of modified datasets in accordance with the plurality of priority classes, wherein the plurality of attributes assigned to the higher priority class are stored in a high priority storage media, wherein the plurality of attributes assigned to a lower priority lass are stored in a low priority storage media, and wherein rows corresponding with the plurality of modified datasets in the row-oriented relational database are broken up into multiple row fragments for storage in different pages by column corresponding with the plurality of attributes such that the row-oriented relational database is reorganized and data access to the database is optimized.

12. The system of claim 11, wherein the attribute storage system is further configured for separately storing a plurality of high class fragments corresponding with the plurality of attributes assigned to the high priority class and for separately storing a plurality of low class fragments corresponding with the plurality of attributes assigned to the low priority class.

13. The system of claim 12, wherein the attribute storage system is further configured for reallocating a memory space corresponding with the high priority class and the low priority class for additional storage.

14. The system of claim 11, wherein the plurality of storage media comprises at least:
high priority storage medium; and
low priority storage medium.

15. A computer program product for optimizing data access in a row-oriented relational database containing a plurality of data sets having a plurality of attributes using a computing device, the computer program product comprising:
a non-transitory computer readable medium;
first program instructions for analyzing a database workload to determine an access frequency for each of the plurality of attributes wherein each of the plurality of attributes corresponds with a column, wherein the plurality of data sets correspond with a plurality of rows, and wherein the analysis is executed inside a database engine where column data associated with the column is accessed;
second program instructions for assigning each of the plurality of attributes to a plurality of priority classes corresponding with the access frequency, wherein the plurality of priority classes includes at least a higher priority class and a lower priority class, and wherein a higher priority class corresponds with a higher access frequency and a lower priority class corresponds with a lower access frequency;
third program instructions for storing the plurality of attributes in a plurality of modified datasets in accordance with the plurality of classes, wherein the plurality of attributes assigned to the higher priority class are stored in a high priority storage medium, and wherein the plurality of attributes assigned to a lower priority class are stored in a low priority storage medium, wherein rows corresponding with the plurality of modified datasets in the row-oriented relational database are broken up into multiple row fragments for storage in different pages by column corresponding with the plurality of attributes such that the row-oriented relational database is reorganized and data access to the database is optimized.

16. The computer program product of claim 15, wherein the plurality of attributes assigned to the high priority class are reallocated to a plurality of high class fragments, and wherein the plurality of attributes assigned to the low priority class are reallocated to a plurality of low class fragments.

17. The computer program product of claim 16, wherein the plurality of high class fragments are stored in the high priority storage medium, and wherein the plurality of low class fragments are stored in the low priority storage medium.

18. The computer program product of claim 16, wherein a memory space corresponding with the high priority class and the low priority class is reallocated for additional storage.

19. The computer program product of claim 16, wherein a memory space corresponding with the high class and the low class is reorganized in-place by reallocating the plurality of high class fragments and the plurality of low class fragments page-by-page.

* * * * *